United States Patent [19]

Shinno et al.

[11] Patent Number: 4,997,508
[45] Date of Patent: Mar. 5, 1991

[54] AUTOMATIC TAPE AFFIXING APPARATUS

[75] Inventors: Nobuo Shinno; Yasuhiro Ohnishi; Toshikazu Shigematsu, all of Osaka, Japan

[73] Assignee: Shinnippon Koki Kabushiki Kaisha (Shinnippon Koki Co., Ltd.), Osaka, Japan

[21] Appl. No.: 327,923

[22] Filed: Mar. 23, 1989

[30] Foreign Application Priority Data

Mar. 28, 1988 [JP] Japan .................................. 63-75633

[51] Int. Cl.$^5$ .............................................. B32B 31/00
[52] U.S. Cl. ...................................... 156/351; 156/574
[58] Field of Search ............... 156/523, 525, 526, 574, 156/577, 361; 156/351

[56] References Cited

U.S. PATENT DOCUMENTS 3,775,219  11/1973  Karlson ............................. 156/526 X
4,627,886  12/1986  Grone et al. ....................... 156/574 X
4,750,965   6/1988  Dippel et al. ...................... 156/523 X Primary Examiner—David A. Simmons
Attorney, Agent, or Firm—Jordan and Hamburg

[57] ABSTRACT

An automatic tape affixing apparatus includes a tape affixing head movable in X-axis, Y-axis, Z-axis, A-axis and C-axis directions, a roller carrying member being vertically movably supported by the tape affixing head, a tape presser roller rotatably supported by the roller carrying member, a sensor for detecting a vertical relative moved amount of the roller carrying member relative to the tape affixing head, and control means for controlling vertical movement of the tape affixing head in accordance with a signal from said sensor so as to eliminate the vertical relative moved amount of the roller carrying member, whereby when the roller carrying member is moved relative to the tape affixing head, the sensor detects the relative moved amount and the tape affixing head is vertically moved in accordance with the relative moved amount so that the relative moved amount of the roller carrying member to the tape affixing head is eliminated.

12 Claims, 9 Drawing Sheets

AUTOMATIC TAPE AFFIXING APPARATUS

BACKGROUND OF THE INVENTION AND RELATED ART STATEMENT

The present invention relates to an apparatus for automatically affixing a tape of composite material on the surface of an adhesion form having various contours to make a lamination of the tape.

In recent years, lightweight plate materials have been produced from a tape of composite material, i.e. a tape prepared by impregnating carbon fiber, aramid fiber or like reinforcing fiber with a thermosetting resin, by affixing the tape on the surface of an adhesion form (body) having specified contours to make a lamination, and thereafter subjecting the lamination to a curing treatment with application of heat and pressure. Unexamined Japanese patent application No. SHO 58-45057, for example, discloses a known method of automatically affixing such a tape of composite material. With this method, the tape is continuously paid off from a reel and pressed against the surface (curved surface) of the adhesion form with a press roller, the press roller is moved along a predetermined path to successively affix tape portions without leaving a clearance therebetween, and the tape affixing direction is changed from layer to layer, whereby a lamination is obtained. When the presser roller comes near a border of an adhesion region, the tape is cut with a cutter disposed between the reel and the presser roller and the cut edge is positioned at the border of the adhesion region.

In the above apparatus, however, the cut edges are not uniformly positioned at the border of the adhesion region due to the fact that the tape is cut without taking into consideration differences between actual paths of the presser roller and programmed paths. As shown in FIG. 1, a tape is cut when a presser roller 20 reaches a predetermined position P before a border of an adhesion region. The presser roller 20 is stopped at the position P and the tape is cut with a cutter 41 (only an adhesion layer of the twolayer tape is cut). However, the contour of a surface 300 of an actual adhesion form is different from the contour of a surface 400 of a programmed adhesion form due to errors on manufacture. A tape affixing head 1 carrying the presser roller 20 is moved in accordance with a programmed path. The presser roller 20 which is moved with coming in contact with the actual surface 300 moves up and down relative to the tape affixing head 1. Consequently, when the tape affixing head 1 is positioned at a solid line and the presser roller 20 moves up to a position illustrated by a solid line, a distance from the lowermost end of the presser roller 20 at the position P to a cutter 41 is different from the programmed one. The difference between the actual distance and programmed distance result in the irregularity of cut edges on the border of the adhesion region. In other words, as shown in FIG. 10, the length of a cut tape 10 is insufficiently long or short to a predetermined border 10a.

SUMMARY OF THE INVENTION

The present invention has worked out to overcome the above-mentioned drawbacks. It is an object of the present invention to provide an automatic tape affixing apparatus which can accurately render tape cut edges in agreement with a border of an adhesion region with eliminating the influence of errors in manufacturing an adhesion form.

An appartus according to the present invention comprises a tape affixing head movable in X-axis, Y-axis, Z-axis, A-axis and C-axis directions, a roller carrying member vertically movably supported by the tape affixing head, a tape pressr roller rotatably supported by the roller carrying member, a sensor for detecting a vertical movement of the roller carrying member relative to the tape affixing head, and control means for controlling vertical movement of the tape affixing head in accordance with a signal from the sensor so as to eliminate the vertical relative moved amount of the roller carrying member.

Accordingly, when the roller carrying member is moved relative to the tape affixing head, the relative moved amount is measured with the sensor. Then the tape affixing head is vertically moved corresponding with the relative moved amount. Accordingly, the relative movement between the tape affixing head and the roller carrying member is eliminated.

DETAILED DESCRIPTION OF PREFERRED EMBODIMENT

Figure 2:
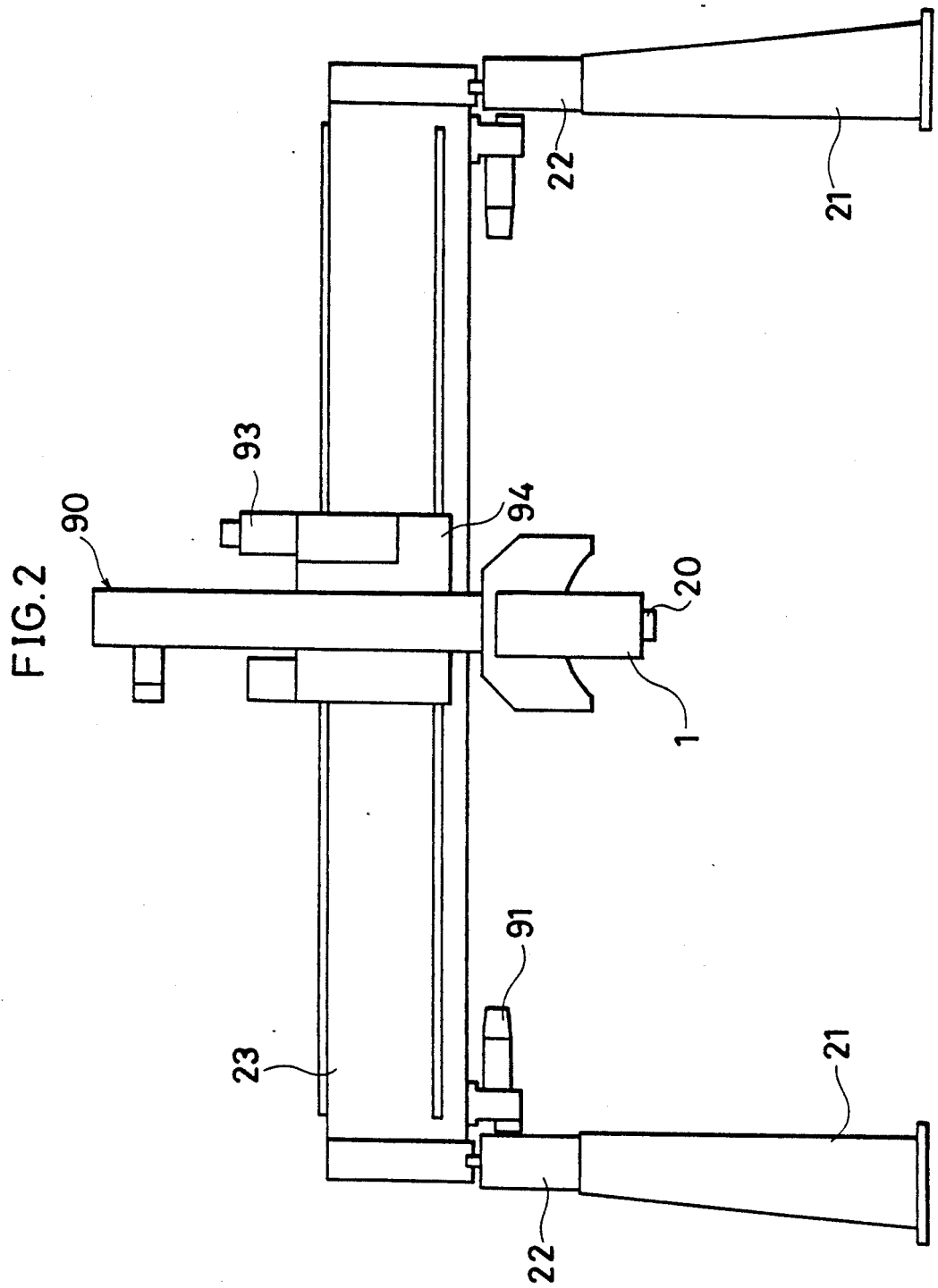
FIG. 2 is an overall schematic front view showing an apparatus according to the present invention.
Figure 3:
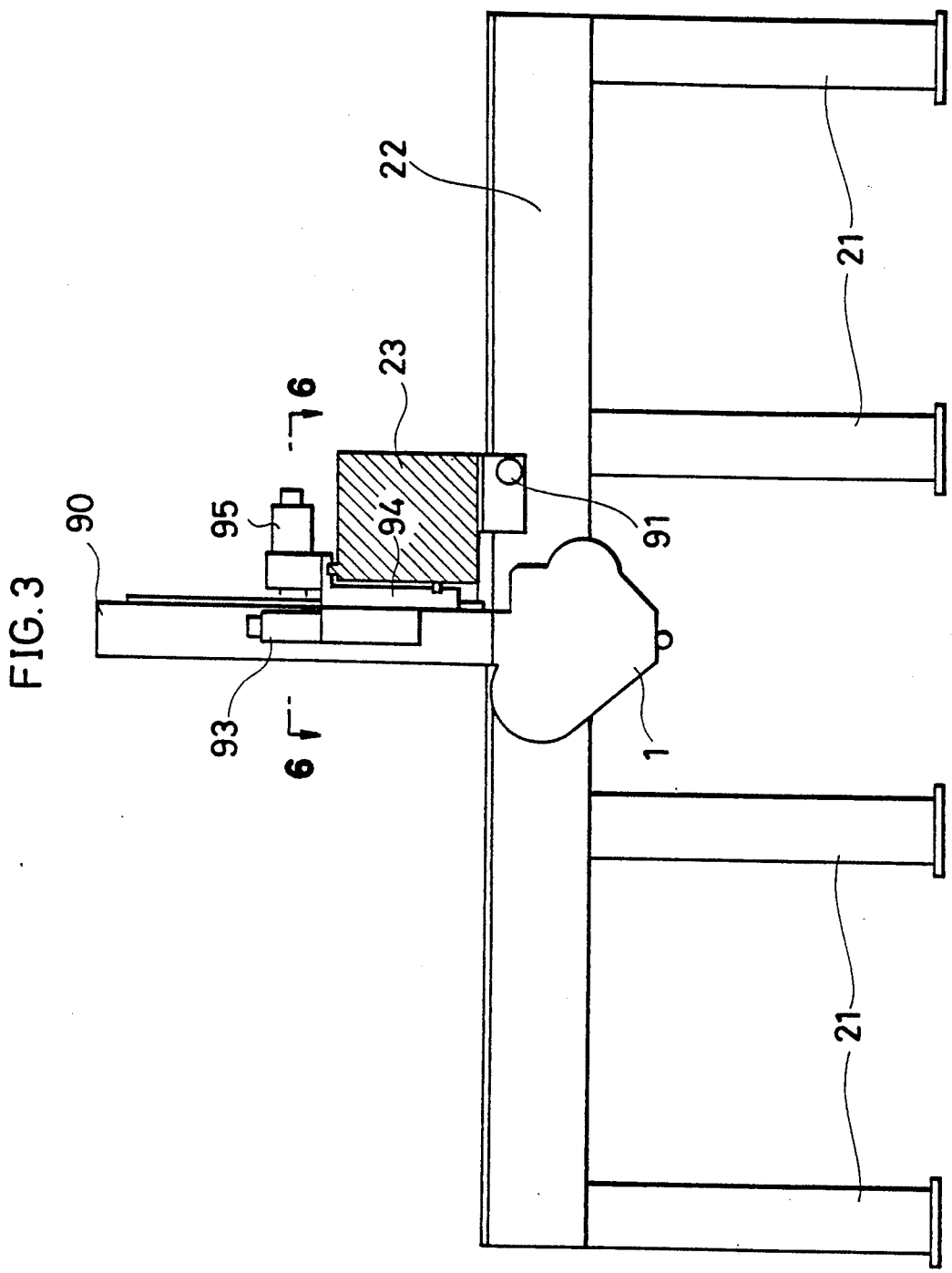
FIG. 3 is a side view showing the apparatus.

With reference to FIGS. 2 and 3, a pair of side rails 22 supported by columns 21 are arranged in parallel to each other. A cross rail 23 extends between and is supported by the side rails 22. The cross rail 23 is moved on the side rails 22 by an X-axis servomotor 91 in the direction of X axis (perpendicular to the plane of FIG. 2). A Y-axis saddle 94 mounted on the cross rail 23 is moved by a Y-axis servomotor 93 along the cross rail 23 in the direction of Y-axis (laterally in FIG. 2). A Z-axis saddle 90 mounted on the Y-axis saddle 94 is moved by a Z-axis servomotor 95 in the direction of Z-axis (vertically).

Figure 4:
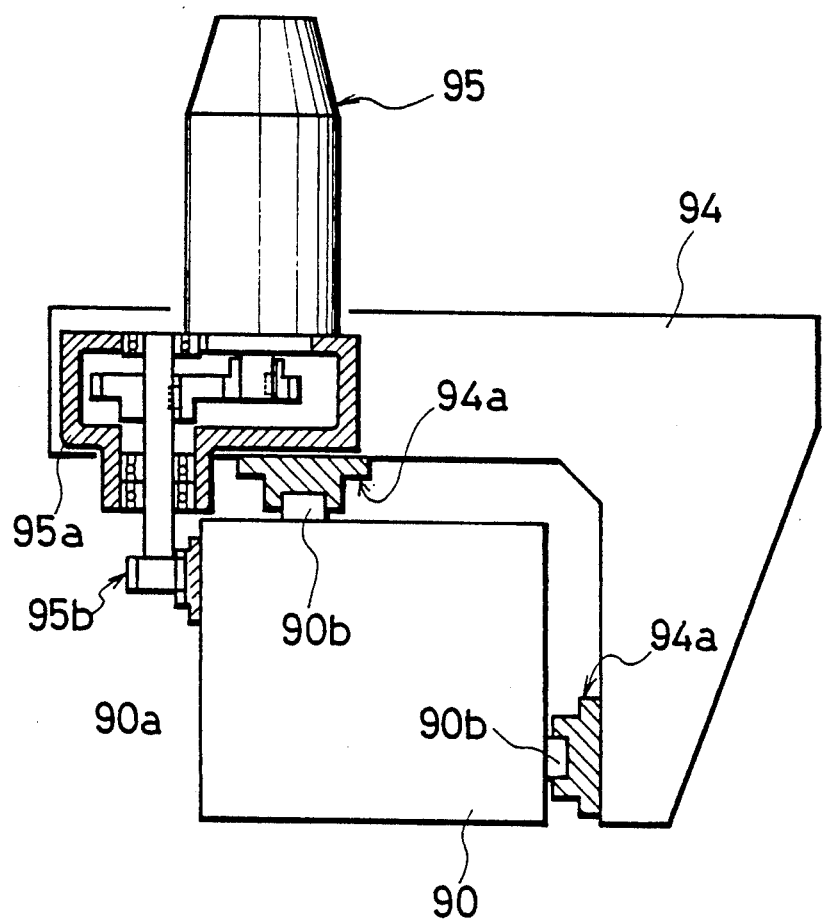
FIG. 4 is a sectional view along the line 6—6 in FIG. 3.

As shown in FIG. 4, a Z-axis servomotor 95 is attached to the Y-axis saddle 94. The Z-axis servomotor 95 has a reduction mechanism 95a and a drive gear 95b projecting therefrom. The drive gear 95b meshes with a rack 90a vertically attached to the Z-axis saddle 90. Guide ways 90b are vertically attached to two sides of the Z-axis saddle 90 which are perpendicular to each other. Guide ways 94a engaging the guide ways 90b are attached to the Y-axis saddle 94.

Figure 5:
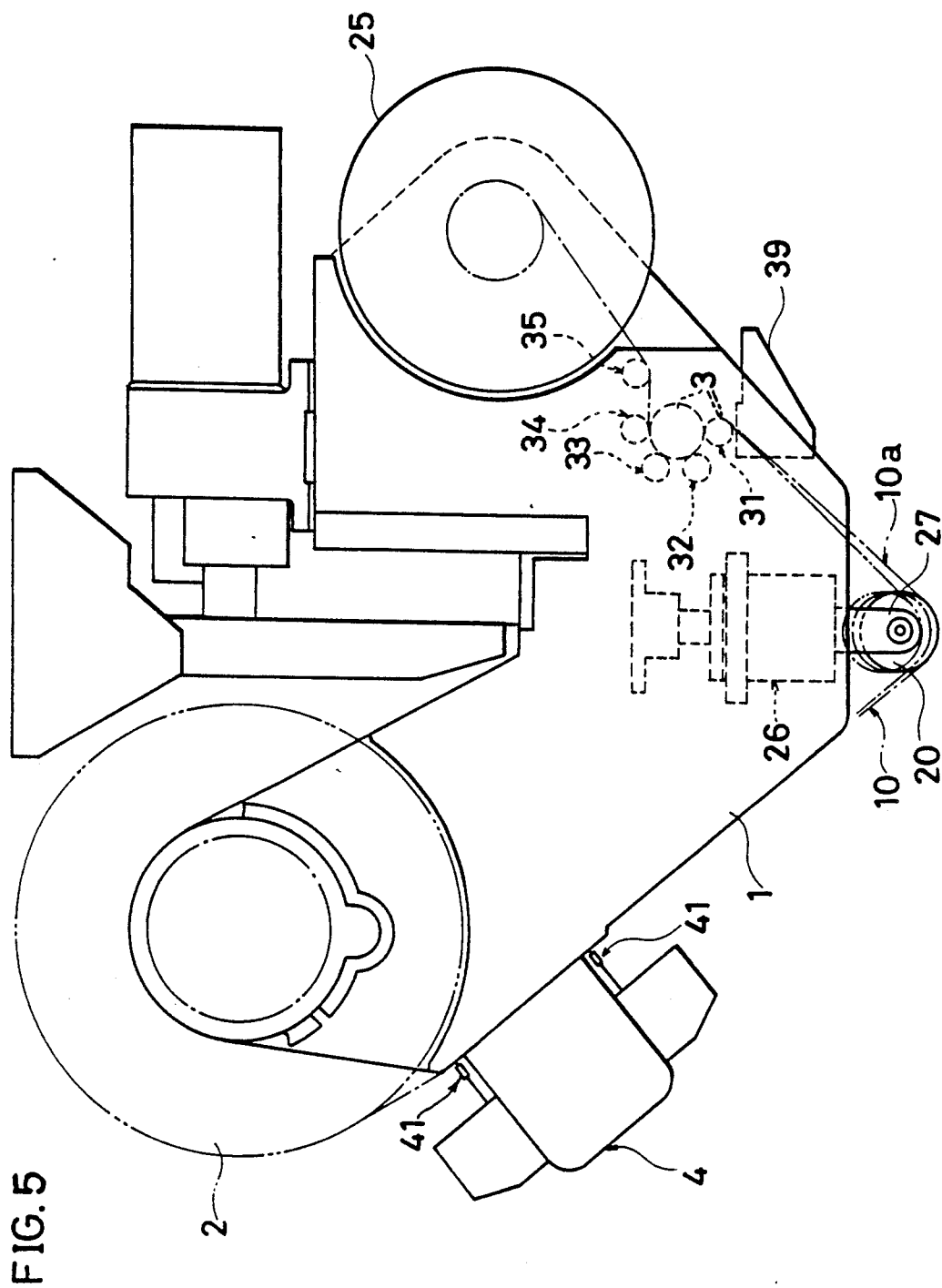
FIG. 5 is a side view showing a tape affixing head.

As shown in FIG. 5, a tape affixing head 1 is provided with a tape supply reel 2 and a take-up reel 25. The tape supply reel 2 carries a roll of double layer tape 10 consisting of composite tape and backing paper. The take-up reel 25 winds up only the backing paper 10a. The tape 10 paid off from the reel 2 is cut in a predetermined length by cutters 41 of a tape cutting device 4. However, the backing paper is not cut. In other words composite tape only is cut. Cut-off strips of the composite tape are then pressed on an adhesion form by a presser roller 20, and the backing paper 10a is run around a drive roller (pinch roller) 3 and then wound on the take-up reel 25. Reference numeral 39 designates a scrap tape collection box.

The presser roller 20 is held by a bracket 27 of a roller carrying member (holding means) 26 attached to the tape affixing head. A plurality of driven rollers 31, 32, 33 and 34 are disposed around the drive roller 3, each of which presses the tape 10 against the peripheral surface of the drive roller 3. An auxiliary roller 35 defines the taking-up direction of the tape 10 from the drive roller 3.

Figure 6:
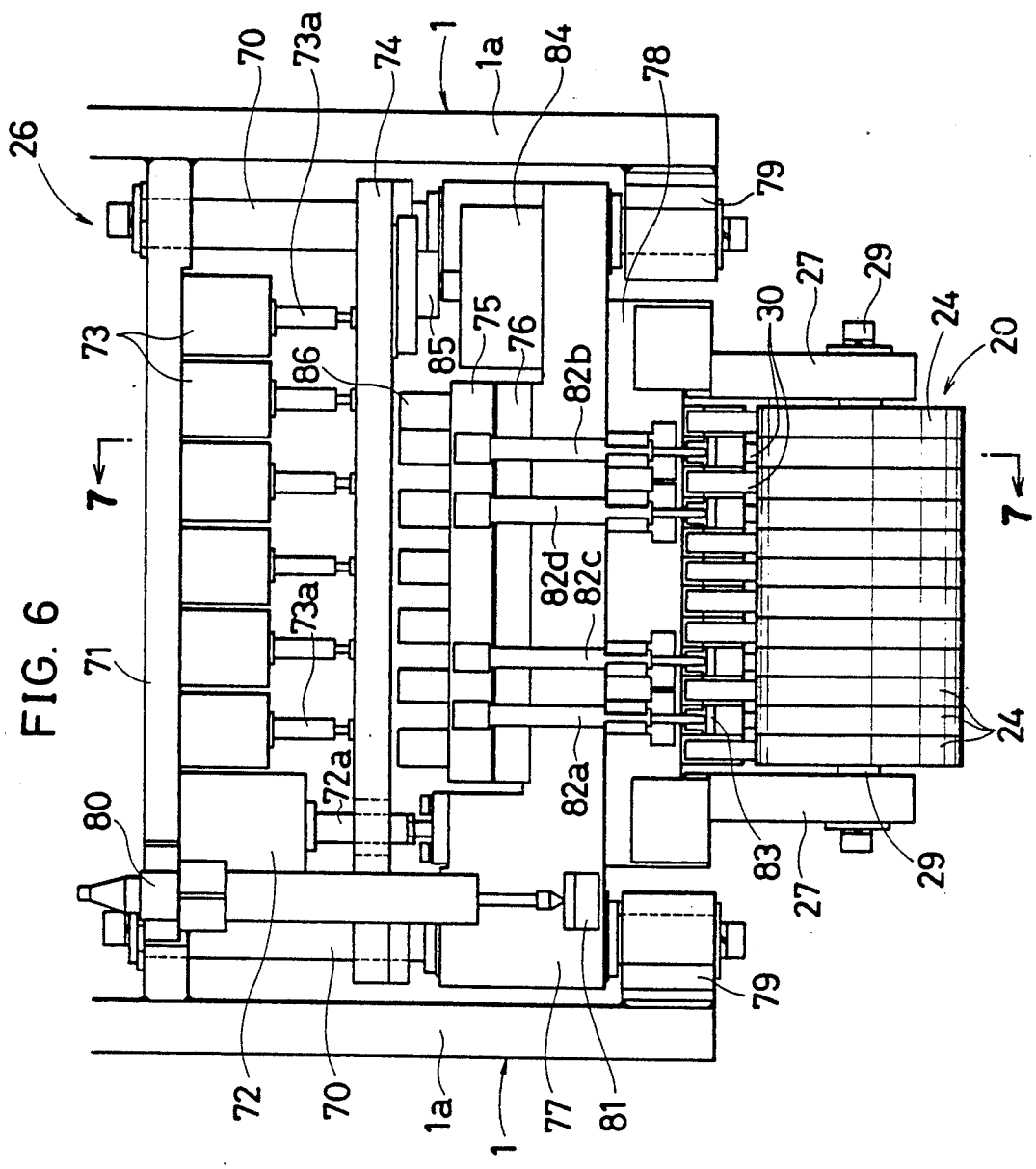
FIG. 6 is a front view showing a presser roller and a mechanism for holding the presser roller.
Figure 7:
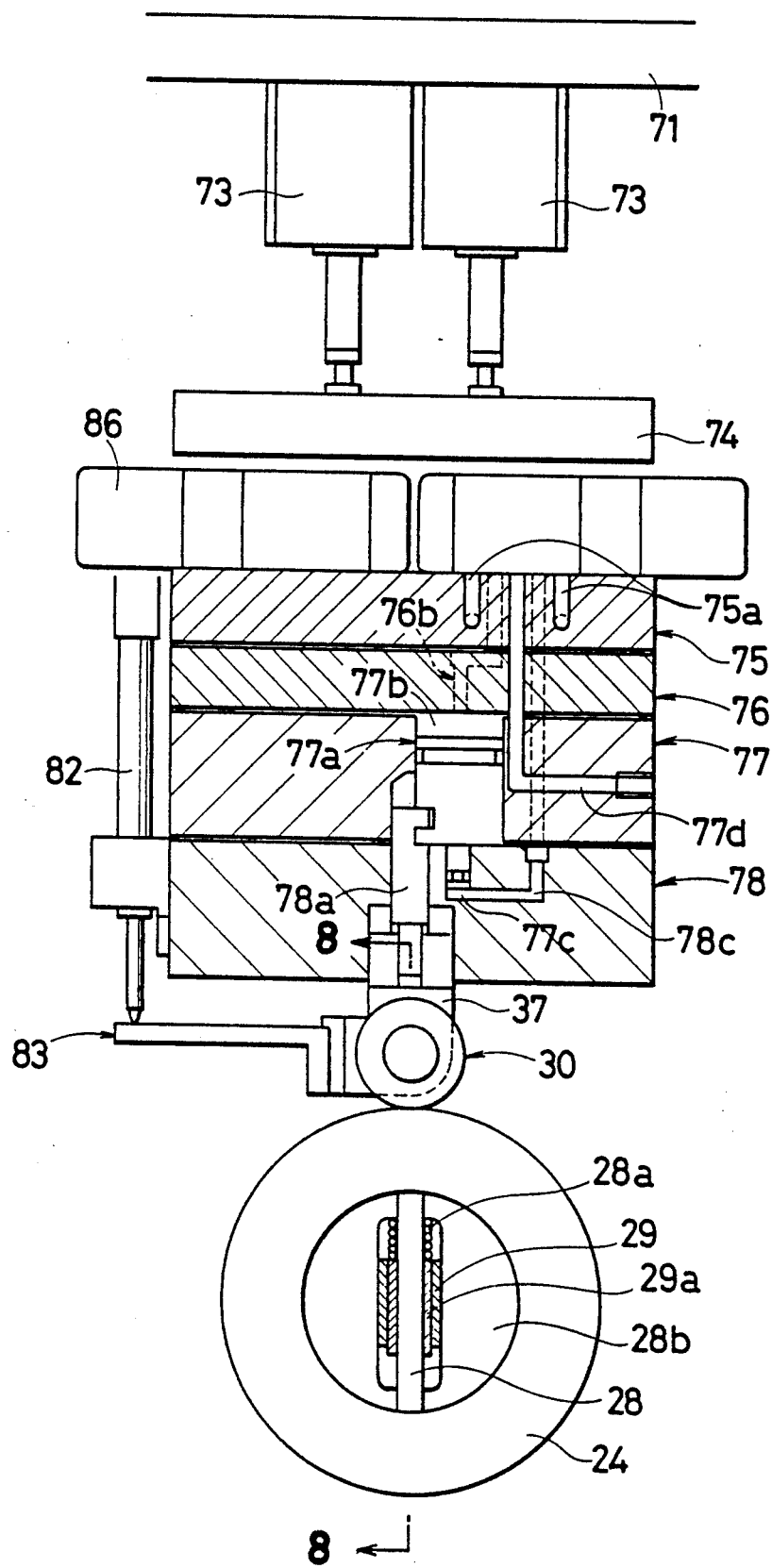
FIG. 7 is a sectional view along the line 7—7 in FIG. 6.
Figure 8:
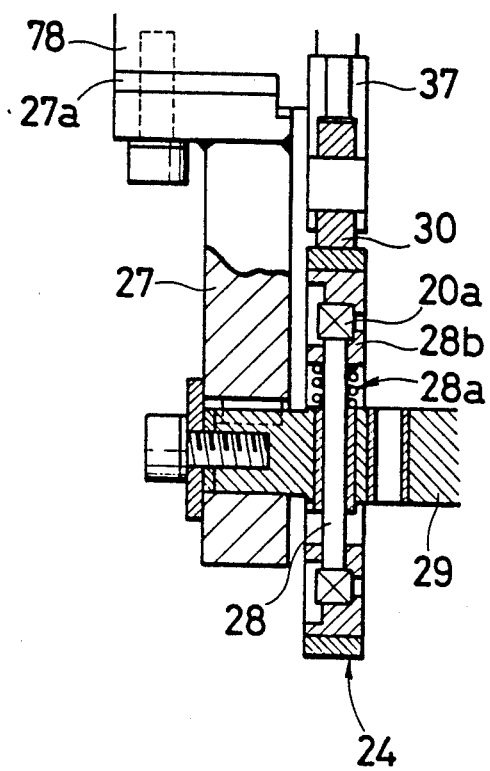
FIG. 8 is a sectional view along the line 8—8 in FIG. 7.
Figure 9:
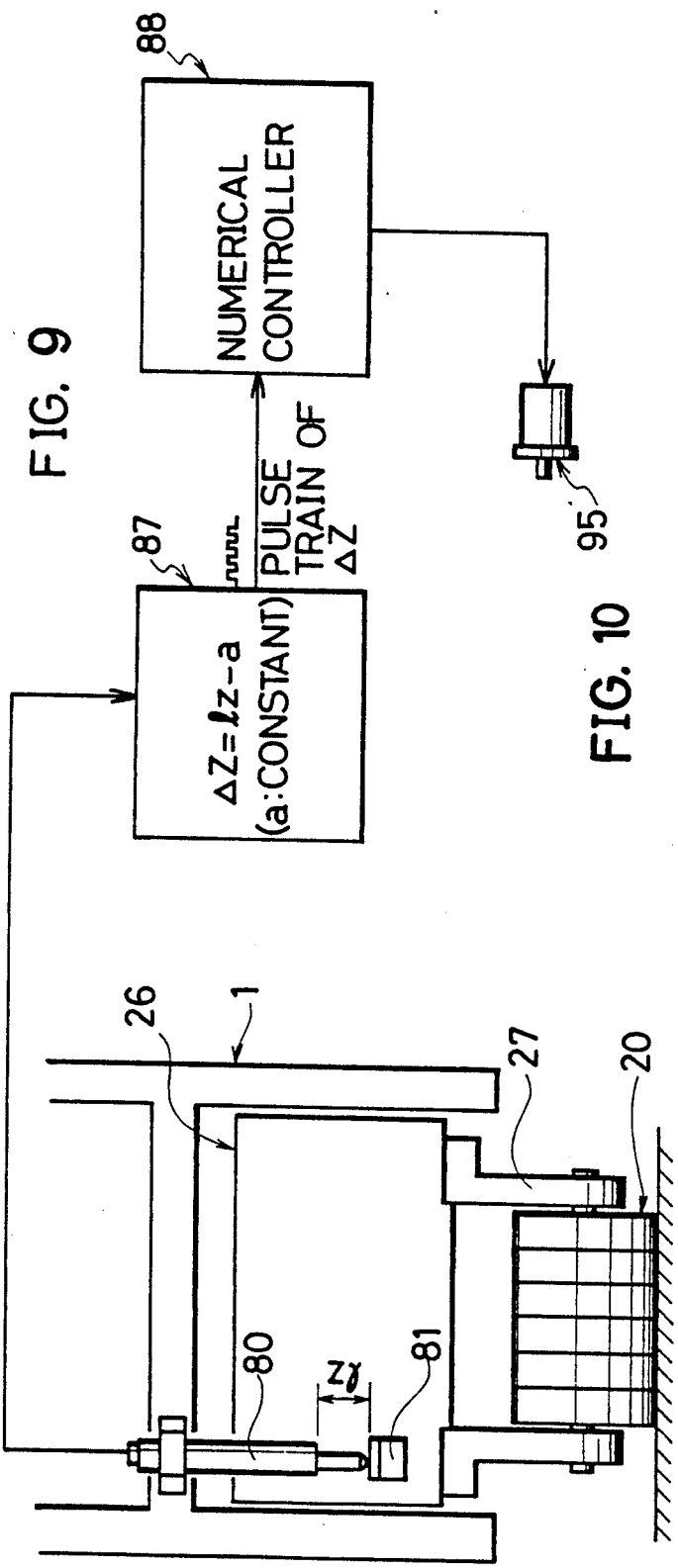
FIG. 9 is a diagram showing a system which vertical movement of the presser roller is measured and then vertical movement of the tape affixing head is controlled.
Figure 10:
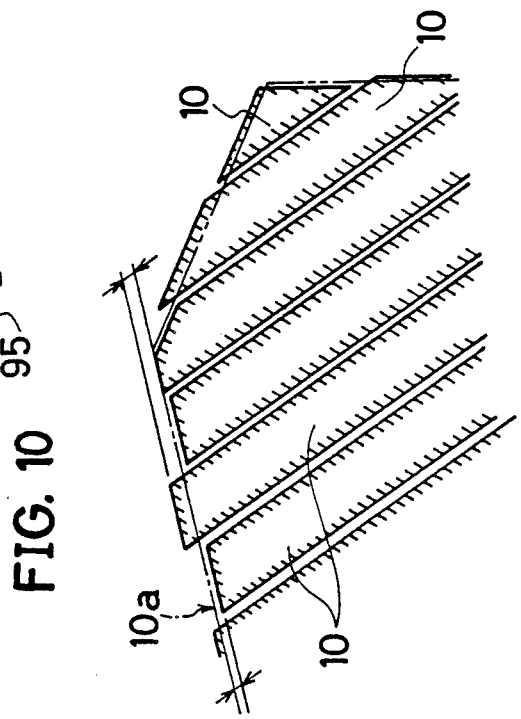
FIG. 10 is a diagram showing a border portion of an adhesion region.

FIGS. 6 to 8 show a structure of the roller carrying member 26 of the tape affixing head 1. The tape affixing head 1 has a pair of opposite side plates 1a. The roller carrying member 26 is disposed between them. The roller carrying member 26 has a holding plate 71 bridged between upper portions of the side plates 1a and brackets 79 mounted on respective lower portions of the same. The holding plate 71 and the brackets 79 hold guide bars 70.

Further, a plurality of pressurizing cylinders 73 and weight canceling cylinders 72 are attached on the underside of the holding plate 71. Although the drawing shows only the pressurizing cylinders 73 and weight canceling cylinder 72 provided in the front portion, the same components are symmetrically provided in the rear portion. The lower ends of piston rods 73a of the pressurizing cylinders 73 are pressed against a pressure plate 74. The pressure plate 74 is slidable vertically along the guide bars 70 extending through the opposite end portions thereof. Under the pressure plate 74 is disposed a block 77 which is connected to a piston rods 72a of the weight canceling cylinders 72. The block 77 is slidable vertically along the guide bars 70 extending through the opposite end portions thereof.

On the block 77 are placed other blocks 76 and 75 on which solenoid operated valves 86 are placed. On the opposite side portions of the block 77 are placed load cells 84. Load cell seats 85 are attached on the underside of the pressure plate 74 so as to face the load cells 84. Drawings shows only the load cell placed on one side. Another load cell is symmetrically provided on the other side of the block 77. Consequently, the load from the pressure plate 74 is transmitted to the block 77 via the load cells 84.

To the underside of the block 77, another block 78 is attached. Brackets 27 for carrying the presser roller 20 are attached to the block 78 by spacers 27a. The presser roller 20 consists of a plurality of roller members 24 disposed widthwise. A shaft 29 for supporting the roller members 24 has the opposite ends unrotatably held by the brackets 27. In each roller member supporting portion, a guide 29a is fixed to the supporting shaft 29. A guide bar 28 is vertically movably passed through the guide 29a. The opposite (upper and lower) ends of the guide bar 28 are fixedly attached to inner roller member 28b. The roller members 24 is rotatably mounted on the outer circumference of the inner roller member 28b with a bearing 20a. A spring 28a is provided between the inner roller member 28b and the supporting shaft 29 so as to apply an upward force to the roller member 24.

A bearing 30 is pressed on the top portion of the roller member 24. A member 37 of holding the bearing 30 is connected to an actuating member 78a which is slidably mounted in the block 78. A piston member 77a is further connected to an upper portion of the actuating member 78a. The piston member 77a is placed in a cylinder chamber of the block 77. An upper chamber 77b and a lower chamber 77c are respectively communicated with passages 76b and 78c which are formed in the blocks 75 to 78. The passages 76b, 78c are switchablly communicated with a passage 77d connected to a fluid source not shown and a drainage passage 75d by the solenoid operated valve 86.

A sensor 80 is mounted on the above mentioned holding plate 71. The vertical position of the block 77 relative to the tape affixing head 1 is measured by contact of the tip of the sensor 80 with a gauge block 81 mounted on the block 77.

Furthermore, a gauge block 83 is attached to the holding member 37 with projecting in a lateral direction. The forward end portion of the gauge block 83 comes into contact with the tip of a sensor 82 mounted on the block 78, so that the vertical position of the bearing 30, or the vertical position of the roller member 24 is measured.

An operation of the embodiment according to the invention will now be described. The block 77 carries the blocks 75, 76 and 78, the load cells 84, the pressure plate 71, the solenoid operated valves 86, the presser roller 20 and the like. The block 77 is pulled up by the weight canceling cylinder 72 through the piston rod so that the weights of the above members are not applied to an adhesion form. In this state, the pressurizing cylinders 73 exert a pressurizing force on the block 77 through the pressure plate 74 and the load cells 84.

On the other hand, pressurized fluid is supplied from the passage 77d via the solenoid operated valves 86 to the upper chamber 77b so that a predetermined downward force is applied to the bearing 30 through the piston member 77a, the actuating member 78a and the bearing holding member 37 to press down the roller member 24 of the presser roller 20.

The sum of pressing forces applied to the roller members 24 by the bearings 30 is made to be larger than the sum of pressurizing forces produced by the pressurizing cylinders 73.

Then, X-axis, Y-axis and Z-axis servomotors 91, 93 and 95 are actuated to press the presser roller 20 at the forward end of the tape affixing head 1 against the adhesion form and to move the tape affixing head 1 along a programmed path on the surface 300 of the adhesion form while the tape 10 is fed from the supply reel 2 at a predetermined rate and tension, whereby the tape is affixed on the surface 300.

Figure 1:
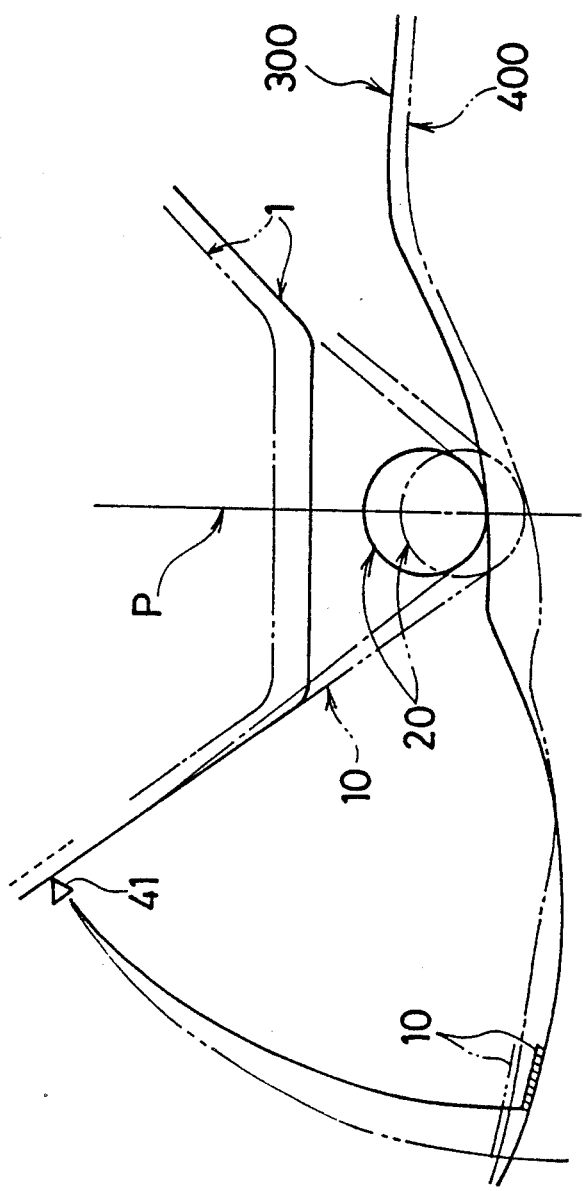
FIG. 1 is a diagram for illustrating the principle of the present invention.

A moving path of the tape affixing head 1 is predetermined to have a constant distance to the surface 400 of a programmed adhesion form. Accordingly, the presser roller 20 is programmed to come into contact with the surface 400 with maintaining a fixed distance to the tape affixing head. In the case that the surface 300 of an actual adhesion form is different from the program surface 400 as shown in FIG. 1, however, the presser roller 20 is moved relative to the tape affixing head 1 to compensate the difference between the surfaces 300 and 400.

Specifically, as shown in FIG. 6, the block 77 is vertically slid along the guide bars 70 with the pressurizing cylinders 73 being actuated. The vertical movement of the block 77 is measured by the sensor 80 mounted on the tape affixing head 1.

A measurement lz obtained by the sensor 80 is put in a microcomputer 87. The computer 87 calculates a relative moved amount $\Delta Z$ of the presser roller 20 in accordance with the following equation:

$$\Delta Z = lz - a$$

wherein a is a constant.

A pulse train corresponding to the relative moved amount $\Delta Z$ is transmitted to a numerical controller 88 from the microcomputer 87 to actuate the Z-axis servomotor 95. The drive gear 95b shown in FIG. 4 is rotated to vertically move the Z-axis saddle 90 through the rack 90a. The tape affixing head 1 moves accordingly in the same direction and by the same distance as the vertical movement of the presser roller 20, so that the predetermined distance between the tape affixing head 1 and the presser roller 20 is maintained.

When the presser roller 20 reaches a predetermined position P before a border of an adhesion region, the tape affixing head 1 is stopped and the tape 10 is cut with the cutter 41, as shown in FIG. 1. Accordingly, it could be seen that even when the presser roller 20 does not come into contact with the surface 400 of the programmed adhesion form but comes into contact with the surface 300 of the actual adhesion form, the distance from the predetermined position P to the cutter 41 falls in the agreement with the programmed one because the tape affixing head 1 is moved up by the same distance as the rise of the presser roller 20 as shown by a phantom line. Thus, the edge of the tape 10 can be accurately placed on the border of the adhesion region.

Further, the presser roller 20 are vertically moved relative to the tape affixing head 1 within the stroke of the pressurizing cylinders 73. There is a likelihood that when moved beyond the stroke, the presser roller 20 is lifted away from the surface 300 of the actual adhesion form or excessively pressed against the adhesion form to damage the apparatus. However, by moving the tape affixing head 1 vertically corresponding to vertical movement of the presser roller 20 as mentioned above, the presser roller can be made to accurately follow the surface 300 of the actual adhesion form without being restricted by the stroke.

As mentioned above, according to the present invention, when a roller carrying member is moved relative to a tape affixing head, the relative moved amount is measured with a sensor and the tape affixing head is then vertically moved corresponding to the relative moved amount, so that the distance between the tape affixing head and the roller carrying member is held at a fixed one. Thus, an apparatus of the present invention is capable of always pressing a tape appropriately against an adhesion form and making the cut edge of the tape in agreement with a border of an adhesion region.

What is claimed is:

1. A tape affixing head for an automatic tape affixing apparatus in which the tape affixing head is moveable in multiple directions for affixing tape onto an affixing surface, said tape affixing head comprising:
    a structure means mounting a tape supply reel and a take-up reel for said tape;
    a roller carrier means movably mounted on said structure means, said roller carrier means carrying a presser roller means operable to press said tape onto said affixing surface;
    sensor means operably disposed between said structure means and said roller carrier means for detecting relative movement between said structure means and said roller carrier means; and
    control means responsive to said sensor means for controlling the movement of said structure means relative to said roller carrier means to thereby maintain a predetermined relative position between said structure means and said roller carrier means.

2. A tape affixing head according to claim 1, wherein said sensor means is mounted on said structure means and has a moveable member engageable with said roller carrier means.

3. A tape affixing head according to claim 1, wherein said pressure roller means is vertically moveable relative to said roller carrier means in accordance with the contour of said affixing surface, said control means being operable to vertically move said structure means to thereby maintain a fixed vertical distance between said structure means and said roller carrier means.

4. A tape affixing head according to claim 1 further comprising a cutter on said structure means for cutting a tape component of said tape, said cutter being operable to cut a predetermined length of said tape component which extends between said pressure roller means and said cutter as said predetermined relative position between said pressure roller means and said structure means is maintained constant by said control means as said pressure roller means follows the contour of said affixing surface.

5. A tape affixing head according to claim 1, wherein said tape affixing head is moveably mounted on a mounting part of said automatic tape affixing apparatus, said control means comprising operable means for moving said structure means relative to said mounting part, said control means being operable to control the operation of said operable means to thereby control the relative positions between said structure means and said mounting part.

6. A tape affixing head according to claim 1, wherein said supply reel and said take-up reel are mounted on a fixed position on said structure means.

7. A tape affixing head according to claim 1 further comprising pressurizing cylinder means and load cell means operably disposed between said structure means and said roller carrier means.

8. Automatic tape affixing apparatus comprising:
    a tape affixing head for affixing tapes onto an affixing surface;
    multiple axis mounting means mounting said tape affixing head for movement on and about multiple axes;
    said tape affixing head comprising a structure means mounting a supply reel and a take-up reel;
    a roller carrier means movably mounted on said structure means, said roller carrier means carrying a pressure roller means operable to press said tape onto said affixing surface;
    sensor means operably disposed between said structure means and said roller carrier means for detecting relative movement between said structure means and said roller carrier means;
    operable means disposed between said multiple axis mounting means and said structure means for moving said structure means relative to said multiple axis mounting means; and control means responsive to said sensor means for controlling said operable means such that said operable means moves said structure means relative to said multiple axis mounting means and relative to said roller carrier means to thereby maintain a predetermined relative position between said structure means and said roller carrier means.

9. A tape affixing head according to claim 8, wherein said supply reel and said take-up reel are mounted on a fixed position on said structure means.

10. A tape affixing head according to claim 1, wherein said roller carrier means further comprises pressurizing means disposed between said roller carrier means and said structure means operable to maintain a pressurizing force between said structure means and said roller carrier means.

11. A tape affixing head according to claim 10, wherein said pressurizing means comprises pressurizing cylinder means and load cell means.

12. A tape affixing head according to claim 10, wherein said pressure roller means overlies said affixing surface and is vertically moveable in accordance with the contour of said affixing surface.

* * * * *